US009354341B2

(12) United States Patent
Beasley et al.

(10) Patent No.: US 9,354,341 B2
(45) Date of Patent: May 31, 2016

(54) DEGHOSTING MEASURED SURVEY DATA (71) Applicant: WESTERNGECO L.L.C., Houston, TX (US)

(72) Inventors: Craig J. Beasley, Houston, TX (US); Richard T. Coates, Katy, TX (US)

(73) Assignee: WesternGeco L.L.C., Houston, TX (US)

(*) Notice: Subject to any disclaimer, the term of this patent is extended or adjusted under 35 U.S.C. 154(b) by 586 days.

(21) Appl. No.: 13/773,398

(22) Filed: Feb. 21, 2013

(65) Prior Publication Data

US 2014/0140172 A1 May 22, 2014

Related U.S. Application Data (60) Provisional application No. 61/728,189, filed on Nov. 19, 2012.

(51) Int. Cl.
*G01V 1/38* (2006.01)
*G01V 1/36* (2006.01)

(52) U.S. Cl.
CPC ............ *G01V 1/364* (2013.01); *G01V 2210/56* (2013.01)

(58) Field of Classification Search
CPC .................................................. G01V 2210/56
USPC .......................................................... 367/24
See application file for complete search history.

(56) References Cited

U.S. PATENT DOCUMENTS

| 7,872,942 | B2 | 1/2011 | Söllner | |
|---|---|---|---|---|
| 2003/0147306 | A1 | 8/2003 | Robertsson | |
| 2008/0025147 | A1 | 1/2008 | Ferber | |
| 2008/0165618 | A1* | 7/2008 | Robertsson | 367/24 |
| 2008/0228402 | A1* | 9/2008 | Ferber | 702/14 |
| 2009/0006054 | A1* | 1/2009 | Song | 703/6 |
| 2010/0142318 | A1 | 6/2010 | Ferber | |
| 2011/0305108 | A1 | 12/2011 | Goujon | |
| 2012/0218858 | A1 | 8/2012 | Soubaras | |
| 2012/0259553 | A1 | 10/2012 | Parkes et al. | |

OTHER PUBLICATIONS

Barr et al., "Attenuation of water-column reverberations using pressure and velocity detectors in a water-bottom cable," SEG Technical Program Expanded Abstracts, 1989, vol. 8(1): pp. 653-656.
Carlson et al., "Increased resolution and penetration from a towed dual-sensor streamer," first break, Dec. 2007, vol. 25: pp. 71-77.
Ferber et al., "I028: L1 Pseudo-Vz Estimation and Deghosting of Single-component Marine Towed-streamer Data," 74th EAGE Conference & Exhibition incorporating SPE EUROPEC, 2012: pp. 1-5.
Fletcher et al., "Time-varying boundary conditions in simulation of seismic wave propagation," Geophysics, Jan.-Feb. 2011, vol. 767(1): pp. A1-A5.
Hammond, "Ghost Elimination from Reflection Records*," Geophysics, Feb. 1962, vol. 27(1): pp. 48-60.

(Continued)

*Primary Examiner* — Ian J Lobo (57) ABSTRACT

Propagation of wavefields are simulated along paths in a survey environment, where the simulated propagation includes an influence of a reflection at an interface that causes ghost data in measured survey data. Deghosting of the measured survey data is performed using the simulated wavefields.

22 Claims, 4 Drawing Sheets (56) References Cited

OTHER PUBLICATIONS

Lindsey, "Elimination of Seismic Ghost Reflections by Means of a Linear Filter," Geophysics, Feb. 1960, vol. 25 (1): pp. 130-140.
Özdemir et al., "The optimal deghosting algorithm for broadband data combination," SEG Houston International Exposition and Annual Meeting, 2009: pp. 147-151.
Robertsson et al., "Rough-sea deghosting using a single streamer and a pressure gradient approximation," Geophysics, Nov.-Dec. 2002, vol. 67(6): pp. 2005-2011.
Robertsson et al., "On the use of multicomponent streamer recordings for reconstruction of pressure wavefields in the crossline direction," Sep.-Oct. 2008, vol. 73(5): pp. A45-A49.
Schneider et al., "A New Data-Processing Technique for the Elimination of Ghost Arrivals on Reflection Seismograms," Geophysics, Oct. 1964, vol. 29(5): pp. 783-805.
Sönneland et al., "2-D Deghosting Using Vertical Receiver Arrays," 56th Ann. Internat. Mtg.: Soc of Expl. Geophys., Session: S11.6, 1986: pp. 516-519.
Soubaras, "Deghosting by joint deconvolution of a migration and a mirror migration," SEG Denver Annual Meeting, 2010: pp. 3406-3410.
Van Melle et al., "Ghost Reflections Caused by Energy Initially Reflected Above the Level of the Shot," Geophysics, 1953, vol. 18: pp. 793-804.
International Search Report and Written Opinion of PCT Application No. PCT/US2013/070671 dated Mar. 3, 2014: pp. 1-11.

* cited by examiner

DEGHOSTING MEASURED SURVEY DATA

CROSS-REFERENCE TO RELATED APPLICATION

This application claims the benefit of U.S. Provisional Application No. 61/728,189 filed Nov. 19, 2012, which is incorporated herein by reference in its entirety.

BACKGROUND

Survey data can be collected and processed to produce a representation (e.g., image) of a subsurface structure. In some implementations, survey data includes seismic survey data collected using seismic survey equipment. The seismic survey equipment includes one or more seismic sources that are activated to produce seismic wavefields propagated into the subsurface structure. A part of the seismic wavefields is reflected from the subsurface structure and detected by seismic receivers that are part of the survey equipment.

Seismic surveying can be performed in a marine environment. An issue associated with marine seismic surveying is the presence of ghost data. Ghost data refer to data in measurement data resulting from reflections from an air-water interface of the marine environment. A seismic wavefield generated by a seismic source is propagated generally downwardly into the subsurface structure. A reflected seismic wavefield (that is in response to the seismic wavefield propagated by the seismic source) propagates generally upwardly toward an arrangement of seismic receivers. In the marine environment, where receivers are generally positioned beneath the water surface, the seismic wavefield reflected from the subsurface structure continues to propagate upward past the receivers towards the air-water interface, where the seismic wavefield is reflected back downwardly.

This reflected, generally downwardly traveling seismic wavefield from the air-water interface is detected by the seismic receivers as ghost data, which appears in measurement data collected by the seismic receivers. The presence of ghost data can result in reduced accuracy when generating a representation of the subsurface structure based on the measurement data.

SUMMARY

In general, according to some implementations, a method includes simulating propagation of wavefields along paths in a survey environment, wherein the simulated propagation includes an influence of a reflection at an interface that causes ghost data in measured survey data. Deghosting of the measured survey data is performed using the simulated wavefields.

In general, according to further or other implementations, the influence of the reflection at the interface that causes ghost data in measured survey data is accounted for in the simulating by recording the simulated propagated wavefields at a position above a location of the interface, wherein the position is at a distance above the location equal to a distance of an actual survey receiver below the interface, and wherein the influence of the reflection is accounted for by filling an intervening space between the interface and the position with water.

In general, according to further or other implementations, the influence of the reflection at the interface that causes ghost data in measured survey data is simulated by applying a reflection operator at a position corresponding to a location of the interface.

In general, according to further or other implementations, the reflection operator represents the reflection as a function of at least one parameter selected from the group consisting of position along the air-water interface, water density, water salinity, and solubility of air in water.

In general, according to further or other implementations, applying the reflection operator includes applying the reflection operator that is dampened by a damping factor to mitigate noise in the propagation of the wavefields.

In general, according to further or other implementations, simulating the propagation of the wavefields includes simulating propagation of an upgoing wavefield between a survey receiver and the interface, and simulating propagation of a downgoing wavefield between the interface and the survey receiver.

In general, according to further or other implementations, simulating the propagation of the upgoing wavefield includes using a first propagation operator for extrapolating the upgoing wavefield at a time point, and simulating the propagation of the downgoing wavefield includes using a second propagation operator for extrapolating the downgoing wavefield at a time point.

In general, according to further or other implementations, simulating the propagation includes identifying an upgoing wavefield at a first time point when the measured survey data includes the upgoing wavefield without interference from a downgoing wavefield.

In general, according to further or other implementations, simulating the propagation further includes computing an upgoing wavefield at a second time point later than the first time point.

In general, according to further or other implementations, simulating the propagation further includes computing a downgoing wavefield produced due to reflection of the upgoing wavefield at the second time point by the interface.

In general, according to further or other implementations, simulating the propagation further includes computing a downgoing wavefield at a third time point later than the second time point, wherein the downgoing wavefield at the third time point corresponds to a position of a seismic receiver.

In general, according to further or other implementations, the downgoing wavefield at the third time point is subtracted from measured survey data measured by the seismic receiver, wherein the subtracting produces deghosted survey data.

In general, according to further or other implementations, the subtracting includes adaptive subtraction that uses an adaptive filter to enhance a target aspect of the deghosted survey data.

In general, according to further or other implementations, simulating the propagation includes computing a first estimate of a particular wavefield based on a first type of measurement data, and the method further includes computing a second estimate of the particular wavefield using a second type of measurement data, and combining the first and second estimates as part of simulating the propagation.

In general, according to further or other implementations, a direct arrival in the measured survey data is removed prior to performing simulating the propagation.

In general, according to further or other implementations, simulating the propagation of the wavefields comprises propagating an upgoing wavefield to the interface, and propagating a downgoing wavefield to the interface. The propagated upgoing wavefield and the propagated downgoing wavefield are compared to determine an error.

In general, according to further or other implementations, estimates of an upgoing wavefield are computed using a sample of plural values of a parameter, and a value of the parameter is derived based on evaluating the computed estimates of the upgoing wavefield In general, according to some implementations, a system includes at least one processor to simulate propagation of an upgoing wavefield and a downgoing wavefield at respective time points, where the simulated propagation includes an influence of a reflection at an interface that cause ghost data in measured survey data, and perform deghosting of the measured survey data to mitigate the ghost data, using the simulated upgoing and downgoing wavefields.

In general, according to further or other implementations, the simulation of propagation of upgoing and downgoing wavefields is based on identifying an initial upgoing wavefield in an initial condition in which the measured survey data is equal to the initial upgoing wavefield without interference from any downgoing wavefield.

In general, according to further or other implementations, the initial condition includes a condition where a time is less than a predefined time value based on a depth of a survey receiver and a sound velocity in a medium in which the upgoing and downgoing wavefields are propagated.

In general, according to further or other implementations, the simulated propagation uses a reflection operator models reflection at the interface that has an irregular shape.

In general, according to further or other implementations, the measured survey data is by survey receivers in a streamer having an irregular profile.

In general, according to further or other implementations, the simulated propagation includes using a first propagation operator to extrapolate upgoing wavefields at different time points, and using a second propagation operator to extrapolate downgoing wavefields at different time points.

In general, according to further or other implementations, the at least one processor is to subtract an extrapolated downgoing wavefield corresponding to a position of a seismic receiver from the measured survey data, to produce deghosted survey data.

In general, according to some implementations, an article comprising at least one machine-readable storage medium stores instructions that upon execution cause a system to simulate propagation of wavefields along paths in a survey environment, wherein the simulated propagation includes an influence of a reflection at an interface that causes ghost data in measured survey data. Deghosting of the measured survey data is performed using the propagated wavefields.

In general, according to further or other implementations, the simulated propagation of the wavefields includes using at least one propagation operator to simulate the propagating.

In general, according to further or other implementations, simulating the propagation uses a relationship that specifies that a wavefield at a given position is computed based on a summation of wavefields at other positions, as multiplied by respective amplitude terms that account for reflection and geometrical spreading.

Other or alternative features will become apparent from the following description, from the drawings, and from the claims.

BRIEF DESCRIPTION OF THE DRAWINGS

Some embodiments are described with respect to the following figures.

DETAILED DESCRIPTION

In the ensuing discussion, reference is made to performing deghosting according to some implementations in a marine survey environment. Note, however, that techniques or mechanisms according to some implementations can also be applied in land-based survey environments or wellbore-based survey environments in which ghost data can appear in measured survey data, as measured by one or more survey receivers.

Moreover, although reference is made to performing surveying to characterize a subsurface structure, techniques or mechanisms according to some implementations can also be applied to perform surveys of other structures, such as human tissue, a mechanical structure, and so forth. In addition, the following describes seismic sources and seismic receivers that are part of seismic survey equipment. In other implementations, other types of survey equipment can be used, which can include other types of survey sources and survey receivers.

Figure 1:
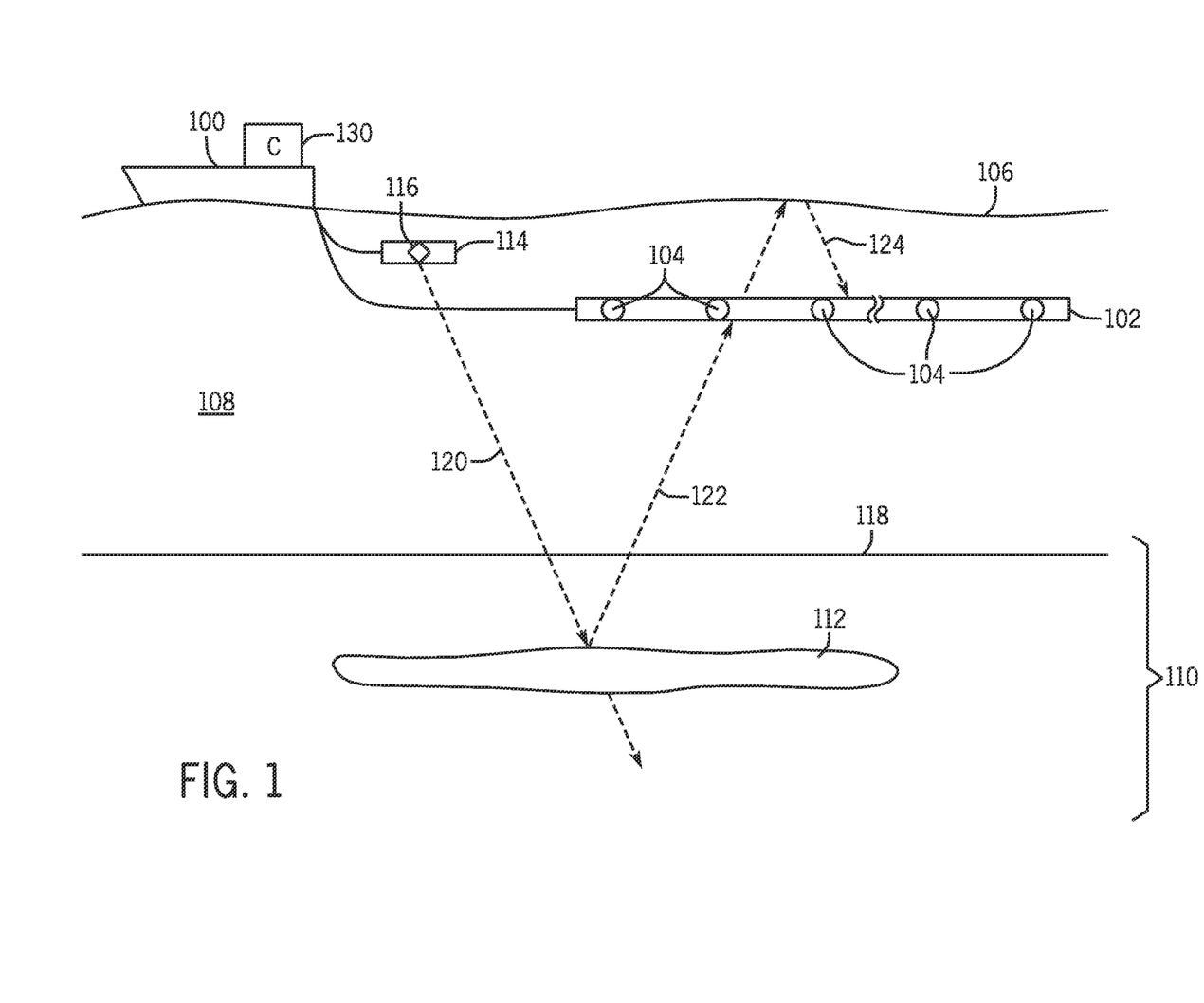
FIG. 1 is a schematic diagram of an example marine survey arrangement for collecting survey data regarding a subsurface structure.

FIG. 1 illustrates an example marine survey arrangement that includes a marine vessel 100 for towing a streamer 102 that includes seismic receivers 104. In addition, the marine vessel 100 (or a different marine vessel) can tow a seismic source assembly 114, which has at least one seismic source 116.

The marine vessel 100 tows the streamer 102 and seismic source assembly 114 through a body of water 108 above a bottom surface 118 (e.g., seafloor). A subsurface structure 110 is located below the bottom surface 118, and the subsurface structure 110 includes at least one subsurface element 112 of interest. Examples of the subsurface element 112 can include a hydrocarbon-bearing reservoir, a freshwater aquifer, a gas injection zone or other subsurface element of interest.

FIG. 1 further depicts an arrow 120 that represents a seismic wavefield generated by the seismic source 116 and traveling generally downwardly into the subsurface structure 110. A portion of the seismic wavefield 120 is reflected from the subsurface structure 110, and travels generally upwardly (as indicated by arrow 122) toward the streamer 102. The upgoing seismic wavefield (122) is detected by the seismic receivers 104 of the streamer 102.

The upgoing seismic wavefield (122) continues to travel upwardly until the wavefield reaches the air-water interface (106), where the seismic wavefield is reflected generally downwardly (as indicated by arrow 124). The reflected downgoing seismic wavefield (124) is also detected at the seismic receivers 104, which causes ghost data to appear in the measurement data collected by the seismic receivers 104. The reflected downgoing wavefield interacts with the upgoing wavefield, which causes constructive and destructive interference that results in the ghost data. This interference is detrimental to the seismic data since it causes amplitude and phase distortions and can result in total elimination of frequencies near the so-called ghost notch frequency.

For simplicity, FIG. 1 depicts an example that includes just one instance of a source downgoing wavefield 120, a reflected upgoing wavefield 122 and a reflected downgoing wavefield

124. In an actual survey environment, there can be many instances of the various downgoing and upgoing wavefields. Also, in other examples, the survey arrangement can include more than one seismic source 116, in which case there can be additional instances of the various wavefields.

Generally, an upgoing wavefield refers to a wavefield that travels in a direction that has at least one directional component that is in the vertical up direction. Similarly, a downgoing wavefield refers to a wavefield that travels in a direction that has at least one directional component that is in the vertical down direction.

FIG. 1 further depicts a control system 130 deployed at the marine vessel 100. The control system 130 can be used to control activation of the seismic source assembly 114. The control system 130 can also receive measurement data collected by the seismic receivers 104. In some examples, the control system 130 is able to process the collected measurement data, such as to develop an image or other representation of the subsurface structure 110. In other examples, the collected measurement data from the seismic receivers 104 can be communicated to a remote system for further processing. The processing performed by the control system 130 or by another system can further include deghosting according to some implementations for deghosting measurement data received by the seismic receivers 104. Deghosting measured survey data refers to removing or mitigating an effect of reflection from the air-water interface 106 (or other type of interface).

Figure 2:
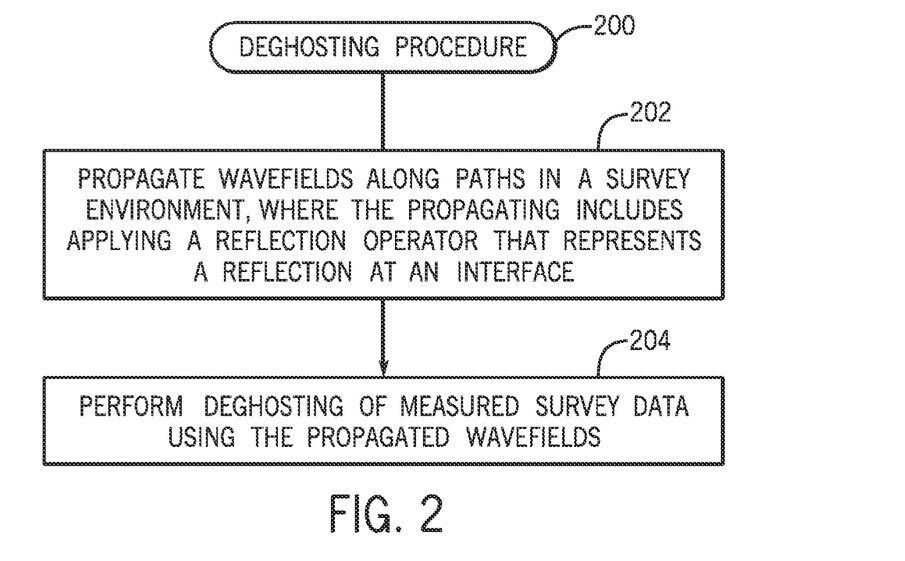
FIG. 2 is a flow diagram of a deghosting procedure according to some implementations.

To deghost measured survey data (as measured by one or more survey receivers 104) in accordance with some implementations, a deghosting procedure 200 shown in FIG. 2 can be performed by the control system 130 or by another system. The deghosting procedure 200 propagates (at 202) wavefields along paths (e.g., paths 120, 122, 124 in FIG. 1) in a survey environment. The propagation of wavefields in task 202 refers to simulated propagation of wavefields, based on use of propagation operators that can extrapolate upgoing wavefields or downgoing wavefields along respective paths at different points in time.

In some implementations, the simulated upgoing and downgoing wavefields can include just pressure wavefields. As a result, the deghosting procedure 200 does not have to rely on other types of measurement data, such as velocity data, acceleration data, redundant measurements from different depths, and so forth. Performing deghosting using a single measurement, and in the particular case of marine data, just pressure wavefields, reduces the complexity of acquisition systems, acquisition procedures, and the deghosting procedure 200. In other implementations, the deghosting procedure 200 can use pressure wavefield data as well as other types of measurement data.

The propagation of wavefields performed at 202 includes applying a reflection operator (R) that represents a reflection at an interface that causes ghost data in measured survey data. For example, in the context of FIG. 1, the interface at which reflection occurs is the air-water interface 106. In other survey arrangements, including land-based survey arrangements, wellbore-based survey arrangements or other survey arrangements, a different interface can cause reflection of wavefields that can result in ghost data appearing in measured survey data, as measured by one or more survey receivers.

In other implementations, a reflection operator does not have to be used. In such implementations, the simulation of propagation of wavefields along paths in a survey environment can account for the influence of a reflection at the air-water interface that causes ghost data in measured survey data in a different way, as discussed further below.

The deghosting procedure 200 next performs (at 204) deghosting of the measured survey data using the propagated wavefields. Effectively, the deghosting procedure 200 relies upon reversing the physical processes in a survey operation that cause the formation of ghost data in the measured survey data. Such physical processes include the physical propagation of upgoing and downgoing wavefields at different points along a streamer that carries seismic receivers. By reversing the physical processes in a survey operation that cause the formation of ghost data, reflected downgoing wavefields (as reflected by the air-water interface 106, for example) can be derived and removed from the total measured survey data to obtain the deghosted survey data. Deghosted survey data refers to measured survey data with ghost data removed or mitigated.

The simulated propagation of wavefields performed at 202 (referred to as a "simulated wavefield propagation process") can include extrapolating upgoing wavefields between a seismic receiver (or seismic receivers) 104 and the air-water interface 106, and extrapolating downgoing wavefields between the air-water interface 106 and the seismic receiver(s) 104. The simulated wavefield propagation process can involve first identifying an upgoing wavefield at an initial time point when the measured survey data includes just the upgoing wavefield (without interference from a downgoing wavefield). In other words, at the initial time point, which is within an initial time interval (discussed further below), reflection from the air-water interface 106 has not yet occurred because it takes some amount of time for an upgoing wavefield to reach the air-water interface 106 and be reflected back as a downgoing wavefield to the seismic receiver(s) 104. As a result, at the initial time point, the survey data measured by the seismic receiver(s) 104 includes just the upgoing wavefield. This results from the principle of causality—the upgoing wavefield is causal with respect to the ensuing downgoing wavefield.

More generally, there is an initial condition during a survey operation when the measured survey data is equal to the upgoing wavefield. In the foregoing example, the initial condition is present during the initial time interval prior to a reflected downgoing wavefield reaching the seismic receiver(s) 104 from the air-water interface 106.

Once the upgoing wavefield at this initial time point is identified, the simulated wavefield propagation process further computes an upgoing wavefield at a second time point after the initial time point. The computed upgoing wavefield at the second time point can correspond to the upgoing wavefield located at the air-water interface 106. Next, the simulated wavefield propagation process computes a downgoing wavefield produced due to reflection of the upgoing wavefield by the air-water interface 106. The downgoing wavefield can be computed by applying the reflection operator to the upgoing wavefield at the second time point. The reflection operator represents the reflection of the upgoing wavefield at the air-water interface 106. The simulated wavefield propagation process then computes a further downgoing wavefield at a later time point, which can correspond to the downgoing wavefield located at the seismic receiver(s) 104.

Note that there can be multiple upgoing wavefields and downgoing wavefields at different positions along the streamer 102, which can be computed by the simulated wavefield propagation process according to some implementations. The extrapolated upgoing and downgoing wavefields allows the deghosting procedure 200 to determine the total downgoing wavefield estimated to have been measured by the seismic receiver(s) 104. This estimated total downgoing wavefield contributes to the ghost data in the measured survey data. By removing the estimated total downgoing wavefield from the measured survey data, the deghosting procedure 200 produces the total upgoing wavefield at the seismic receiver(s) 104. The total upgoing wavefield represents the deghosted survey data.

Figure 3:
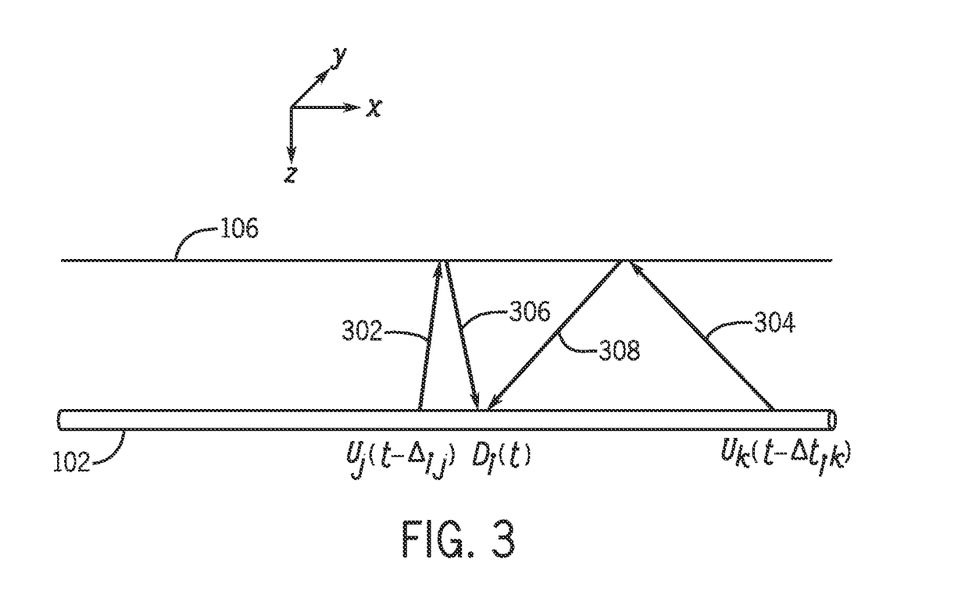
FIG. 3 is a schematic diagram of upgoing and downgoing wavefields, according to an example.

FIG. 3 illustrates an example of several example upgoing and downgoing wavefields. Neglecting noise and direct arrivals, for a downgoing wavefield to exist, the causal effect specifies that there has to be first an upgoing wavefield that is reflected from the air-water interface 106.

There can be various sources of noise, such as noise caused by towing of the streamer 102 in the body of water 108, noise from the water environment, and noise from other sources. Traditional noise removal techniques can be used for removing or reducing noise in the measured survey data as measured by the seismic receivers 104.

Direct arrivals are those seismic events that are recorded when the source wavefield has just propagated in the water. A seismic source can be positioned at or above the depth of a seismic receiver as shown in FIG. 1, where the seismic source 116 is positioned above the seismic receivers 104 (in terms of depth). As a result, there can be a direct arrival of a downgoing wavefield from the seismic source 116 at the seismic receivers 104. Since the source seismic wavefield is known, this direct arrival can be removed from the measured survey data by the seismic receivers 104. For example, the source wavefield can be modeled and subtracted out from the measured survey data or filtered by other means to remove the direct arrival effect.

In FIG. 3, the parameter $D_i(t)$ represents a downgoing wavefield at position i at time t. This downgoing wavefield $D_i(t)$ is the sum of all downgoing wavefields that arrive at position i at time t:

$$D_i(t) = \Sigma_j A_{ij} U_j(t - \Delta t_{ij}), \quad \text{(Eq. 1)}$$

where $\Delta t_{ij}$ is the travel time for the upgoing wavefield $U_j$ from position j to reach location i, and $A_{ij}$ is an amplitude term to account for reflection and geometrical spreading. As discussed further below, the terms $A_{ij}$, $\Delta t_{ij}$, and any phase effects are included in wave-equation propagators, including the reflection operator and propagation operators, that are used to perform simulated propagation of upgoing and downgoing wavefields.

In the example of FIG. 3, an upgoing wavefield 302 at position j and an upgoing wavefield 304 at position k contribute to the downgoing wavefield $D_i(t)$ measured by a seismic receiver at position i. The upgoing wavefield 302 from position j is reflected by the air-water interface 106 to produce a respective downgoing wavefield 306. Similarly, the upgoing wavefield 304 from position k is reflected by the air-water interface 106 to produce a downgoing wavefield 308. The estimated downgoing wavefield $D_i(t)$ as measured by a seismic receiver at the streamer 102 is the sum of the downgoing wavefields 306 and 308. Based on Eq. 1, this sum can be expressed as $D_i(t) = A_{ij} U_j(t - \Delta t_{ij}) + A_{ik} U_k(t - \Delta t_{ik})$.

The total wavefield W at time t is the sum of upgoing and downgoing wavefields:

$$W(t) = U(t) + D(t). \quad \text{(Eq. 2)}$$

Using the Eq. 1 relationship, the total wavefield at position i is expressed as:

$$W_i(t) = U_i(t) + \Sigma_j A_{ij} U_j(t - \Delta t_{ij}). \quad \text{(Eq. 3)}$$

Solving for $U_i(t)$ gives the following relationship:

$$U_i(t) = W_i(t) - \Sigma_j A_{ij} U_j(t - \Delta t_{ij}). \quad \text{(Eq. 4)}$$

In Eq. 4, the upgoing wavefield $U_i(t)$ at a given position (i) is computed based on a summation of upgoing wavefields $U_j(t - \Delta t_{ij})$ at other positions (j), as multiplied by respective amplitude terms $A_{ij}$ that account for reflection and geometrical spreading. The relationship expressed in Eq. 4 can be used to perform the simulation of propagation of wavefields.

If noise and direct arrivals are removed, $U_i(t)$ is causal and there is an initial time interval for which $W_i(t) = U_i(t)$. This initial time interval includes time points t that satisfy t<2d/V, where d is the depth of the seismic receiver 104 (as measured from the air-water interface 106) and V is the sound velocity in water. Since early values of $U_i(t)$ for t<2d/V are known, and $W_i(t)$ (the total measured survey data at position i) is known, values of $U_i(t)$ at later time points can be computed. In addition, by applying the reflection operator (R), downgoing wavefields resulting from reflection of respective upgoing wavefields $U_i(t)$ from the air-water interface 106 can be derived.

The simulated wavefield propagation process according to some implementations is a wave-equation process that propagates an upgoing wavefield from seismic receiver(s) 104 through the water layer, reflects the upgoing wavefield at the air-water interface 106 and then propagates a downgoing wavefield downwardly.

FIG. 3 shows the air-water interface 106 as being a flat interface. However, more generally, the air-water interface 106 can have an irregular shape (such as the shape of a sea surface with sea waves). The reflection operator can represent reflection from the air-water interface 106 having the irregular shape.

In addition, the streamer 102 can also have an irregular profile (different from the flat profile shown in FIG. 3). Seismic receivers 104 in the streamer 102 having the irregular shape can be at different depths, instead of all being at the same depth as shown in FIG. 3. The different depths of the seismic receivers 104 in the irregularly-shaped streamer 102 can be recorded and accounted for during the deghosting procedure 200.

In the ensuing discussion, the total wavefield W, upgoing wavefield U, and downgoing wavefield D, are expressed as a function of a three-dimensional coordinate (x,y,z) and time (t). The x dimension, y dimension, and z dimension of the three-dimensional coordinate are depicted in FIG. 3. The x dimension extends along the in-line direction of the streamer 102. The y dimension is generally perpendicular to the x dimension and extends along the cross-line direction of the streamer 102. The z dimension is generally perpendicular to each of the x and y dimensions, and extends along the depth direction. Each coordinate that is based on a specific combination of values of the x, y, and z dimensions represents a particular position, to replace the i, j, and k variables used above.

Let $W(x,y,z,t) = U(x,y,z,t) + D(x,y,z,t)$, where $W(x,y,z,t)$ is the recorded wavefield for a single shot (with noise and direct arrival removed), and $U(x,y,z,t)$ and $D(x,y,z,t)$ are the upgoing and downgoing wavefields, respectively. To find the upgoing and downgoing wavefields, the upgoing wavefield $U(x_r, y_r, z_r, t)$ and downgoing wavefield $D(x_r, y_r, z_r, t)$ are computed for all t>0, where $x_r, y_r, z_r$ denotes a receiver position. In other words, $U(x_r, y_r, z_r, t)$ represents the upgoing wavefield at a receiver position $(x_r, y_r, z_r)$, while $D(x_r, y_r, z_r, t)$ represents the downgoing wavefield at the receiver position $(x_r, y_r, z_r)$.

To begin the iteration, set $$U(x,y,z,t) = D(x,y,z,t) = 0 \text{ for all } x,y,z \text{ when } t=0.$$

Let $P^+(\Delta t)$ represent an upward wave propagation operator that propagates a wavefield forward in time by the time step $\Delta t$, and $P^-(\Delta t)$ represent a downward wave propagation operator. The propagation operators $P^+(\Delta t)$ and $P^-(\Delta t)$ are wave-equation operators that output respective extrapolated upgoing and downgoing wavefields at a later time point that is Δt after current respective upgoing and downgoing wavefields. Given an input wavefield at a given time t1, a propagation operator computes the propagated wavefield at time point t1+Δt. The propagation of the wavefield takes into account any geometrical spreading effects as the wavefield propagates through a medium, which in the marine survey environment includes water. In some examples, the propagation operator models a behavior of a pressure wavefield in the medium based on parameters representing characteristics of the medium (e.g., density, salinity, etc.). ?

In some examples, the propagation operators $P^+(\Delta t)$ and $P^-(\Delta t)$ can both be set to be a finite-difference approximation to the second-order acoustic wave equation traditionally used to simulate acoustic propagation. In other examples, the propagation operators $P^+(\Delta t)$ and $P^-(\Delta t)$ can both be set to be a finite-difference approximation to the first-order acoustic wave equations. In further examples, the propagation operators $P^+(\Delta t)$ and $P^-(\Delta t)$ can both be pseudo-spectral, or finite-element, or spectral element, or boundary element approximations to either the first-order or second-order acoustic wave equations. In yet further examples, the propagation operators $P^+(\Delta t)$ and $P^-(\Delta t)$ can both be phase-shift operators. In additional examples, the propagation operators $P^+(\Delta t)$ and $P^-(\Delta t)$ can both be finite-difference, or pseudo-spectral, or finite-element, or spectral element, or boundary element approximations to the one-way acoustic wave equation. In yet other examples, the propagation operators $P^+(\Delta t)$ and $P^-(\Delta t)$ can each be a different choice from each other selected from the options listed above.

In other examples, other types of propagation operators $P^+(\Delta t)$ and $P^-(\Delta t)$ can be used.

Having defined $U(x,y,z,t)$ and $D(x,y,z,t)$ at time t=0, further upgoing and downgoing wavefields can be propagated iteratively in time. Given $U(x,y,z,t)$ and $D(x,y,z,t)$, additional U and D wavefields can be extrapolated forward in time with time step Δt as follows:

$$U(x,y,z,t+\Delta t)=P^+(\Delta t)*U(x,y,z,t) \text{ for } z_s \leq z < z_r,\quad \text{(Eq. 5)}$$

$$D(x,y,z,t+\Delta t)=P^-(\Delta t)*D(x,y,z,t) \text{ for } z_s < z \leq z_r,\quad \text{(Eq. 6)}$$

In some examples described in the present disclosure, it is assumed that the air-water interface 106 is explicitly present in a model used for performing the simulation of wavefield propagation. In other examples, techniques can utilize the fact that the air-water interface can approximately behave as a mirror to simulate the downgoing wave $D(x,y,z,t)$ in a different manner. In the latter examples, an air layer above the air-water interface 106 can be replaced with water, and receivers can be positioned in this new extended water layer a distance above the location of the previous air-water boundary equal to the actual distance of the receivers below it. The negative of the amplitude of upgoing waves at these receivers above the location of the previous air-water boundary can then be set equal to the downgoing waves generated by the presence of the free surface, i.e., $D(x,y,z,t)=-U(x,y,-z,t)$, where z=0 is defined as the location of the air-water boundary. By using the foregoing relationship, an explicit reflection operator does not have to be employed in some examples. Using such techniques, the influence of the reflection at the air-water interface 106 is accounted for in the wavefield simulation by recording the simulated propagated wavefields at a position above a location of the air-water interface, where the position is at a distance above the location being equal to a distance of an actual survey receiver below the air-water interface. The influence of the reflection is accounted for by filling an intervening space (the air layer noted above) between the air-water interface and the position above the air-water interface with water.

In the ensuing discussion, reference is made to FIGS. 4A-4E and 5A-5E. FIGS. 4A-4E depict simulated propagation of upgoing wavefields at different time points, while FIGS. 5A-5E depict simulated propagation of downgoing wavefields at different time points. In these figures, various small circles represent the seismic receivers 104 of the streamer 102 of FIG. 1. The streamer 102 is at depth $z_r$. The air-water interface 106 is at depth $z_s$. Without loss of generality, these figures illustrate the process for a profile in two spatial dimensions. The case of three spatial dimensions is straightforward.

As noted above, for t sufficiently small (t<2d/V, where is d is the water depth and V is the sound velocity in water), by causality, $$U(x_r,y_r,z_r,t)=W(x_r,y_r,z_r,t).$$

Figure 4A:
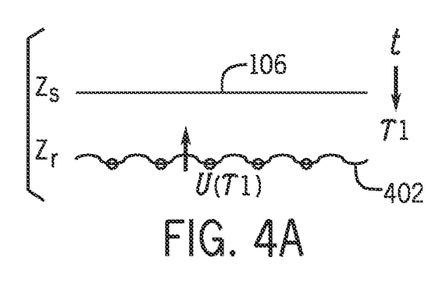
FIGS. 4A-4E and 5A-5E illustrate simulated propagation of upgoing and downgoing wavefields in accordance with some implementations.
Figure 5A:
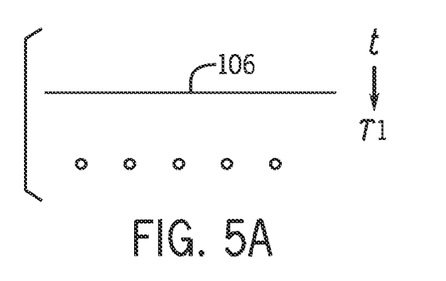
Figure 5B:
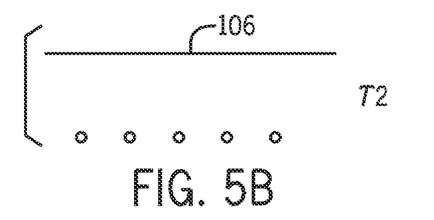
Figure 5C:
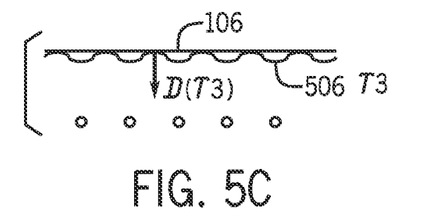

In FIGS. 4A and 5A, at an initial time point T1 that satisfies the initial condition noted above, the measured survey data, $W(x_r,y_r,z_r,T1)$, as measured by seismic receiver(s) 104, includes just the upgoing wavefield $U(x_r,y_r,z_r,T1)$. At this initial time point T1, there has been no reflection from the air-water interface 106 to produce a downgoing wavefield. FIG. 5A shows that there is no downgoing wavefield yet at time point T1. The upgoing wavefield $U(x_r,y_r,z_r,T1)$ is represented by 402 in FIG. 4A.

Figure 4B:
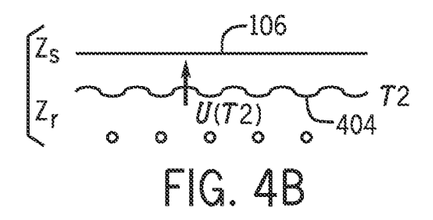

In FIG. 4B, the $P^+(\Delta t)$ operator takes as input the upgoing wavefield $U(x_r,y_r,z_r,T1)$ and produces an extrapolated upgoing wavefield 404 at a later time point 2 (=T1+Δt), as represented by $U(x_d,y_d,z_d,T2)$. In the example of FIG. 4B, the upgoing wavefield 404 is at a depth $z_d$ between $z_r$ and $z_s$. As depicted in FIG. 5A, at time point T2, there is still no downgoing wavefield.

Figure 4C:
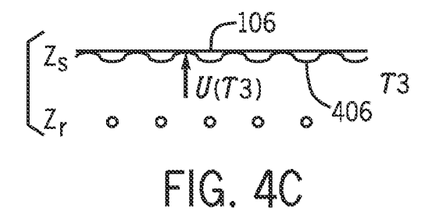

As shown in FIG. 4C, the $P^+(\Delta t)$ operator takes as input the upgoing wavefield $U(x_d,y_d,z_d,T2)$ and produces an extrapolated upgoing wavefield 406 at a later time point 3 (=T2+Δt), as represented by $U(x_s,y_s,z_s,T3)$. The upgoing wavefield $U(x_s,y_s,z_s,T3)$ is located at depth $z_s$ at the air-water interface 106. The upgoing wavefield 406 is reflected by the air-water interface 106, to produce a downgoing wavefield 506 (represented by $D(x_s,y_s,z_s,T3)$) shown in FIG. 5C. The downgoing wavefield 506 is produced by applying a reflection operator on the upgoing wavefield 406 in FIG. 4A.

In examples where the air-water interface 106 is flat and it is assumed that the entirety of the upgoing wavefield is reflected from the air-water interface 106, the reflection operator can be simply represented with a reflection coefficient of −1. In such example, the downgoing wavefield is $D(x_s,y_s,z_s,T3)=-U(x_s,y_s,z_s,T3)$.

In other examples, the boundary condition of the air-water interface 106 can be replaced by more complex reflection mechanisms and can accommodate an irregular air-water interface 106. More generally, $D(x_s,y_s,z_s,t)=R*U(x_s,y_s,z_s,t)$, where R represents a reflection operator that specifies how an upgoing wavefield is reflected by the air-water interface 106. The reflection operator R accounts for a boundary effect of the interface 106, which can be a function of at least one parameter selected from the group consisting of position along the air-water interface 106, velocity of sound in air and water, water density at a given location, water salinity at a given location, and solubility of air in water at a given location. In some cases, the reflection operator R can also account for an absorbing boundary effect, where the air-water interface 106 absorbs a portion of the upgoing wavefield such that just a part of the upgoing wavefield is reflected.

Figure 4D:
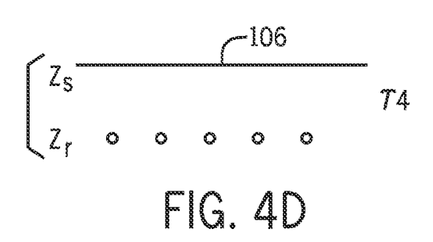
Figure 4E:
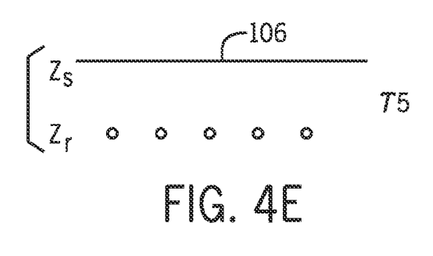
Figure 5D:
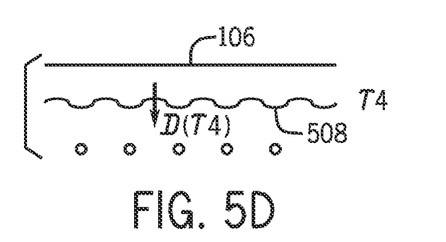

As shown in FIG. 5D, the P⁻(Δt) operator takes as input the downgoing wavefield $D(x_s,y_s,z_s,T3)$ and produces an extrapolated downgoing wavefield 508 at time point T4, which is represented by $D(x_d,y_d,z_d,T4)$. The extrapolated downgoing wavefield 508 is at a depth $z_d$ between $z_s$ and $z_r$. In FIG. 4D, it is assumed there is no further upgoing wavefield. In other examples, there would be a further upgoing wavefield in FIG. 4D at time point T4 that would be forward propagated as discussed above.

Figure 5E:
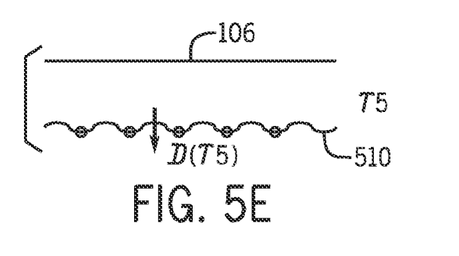

As shown in FIG. 5E, the P⁻(Δt) operator takes as input the downgoing wavefield $D(x_d,y_d,z_d,T4)$ and produces an extrapolated downgoing wavefield 510 at time point T5, which is represented by $D(x_r,y_r,z_r,T5)$. The extrapolated downgoing wavefield 510 is at the depth $z_r$ of the seismic receiver(s) 104. In FIG. 5E, it is again assumed that there is no further upgoing wavefield at time point T5.

For each receiver position, the upgoing wavefield $U(x_r,y_r,z_r,t)$ can be computed as:

$$U(x_r,y_r,z_r,t)=W(x_r,y_r,z_r,t)-D(x_r,y_r,z_r,t). \tag{Eq. 7}$$

At time T5 in FIG. 5E, the upgoing wavefield $U(x_r,y_r,z_r,T5)$ is computed as follows:

$$U(x_r,y_r,z_r,T5)=W(x_r,y_r,z_r,T5)-D(x_r,y_r,z_r,T5), \tag{Eq. 8}$$

where $D(x_r,y_r,z_r,T5)$ is the extrapolated wavefield 510 of FIG. 5E.

The derived upgoing wavefield $U(x_r,y_r,z_r,T5)$ is the deghosted survey data.

The example of FIGS. 4A-4E and 5A-5E can be extended to examples where there are more upgoing and downgoing wavefields. After all iterations are performed for the upgoing and downgoing wavefields, calculations of $U(x_r,y_r,z_r,t)$ and $D(x_r,y_r,z_r,t)$ for all t>0 are performed. The derived upgoing wavefields $U(x_r,y_r,z_r,t)$ can be used deghosted data, while the derived downgoing wavefields $D(x_r,y_r,z_r,t)$ can be injected as a source term in imaging algorithms, such as reverse time migration algorithms.

The accuracy of estimation procedures such as the wave propagations described herein can be dependent on the accuracy of various parameters, such as depth of receiver, water velocity, surface reflection coefficient, and so forth. One approach to mitigating the effects of errors in these parameters is to modify the subtraction in Eq. 8 to be an adaptive subtraction. In adaptive subtraction, an adaptive filter f is used as follows:

$$U(x_r,y_r,z_r,T5)=W(x_r,y_r,z_r,T5)-f*D(x_r,y_r,z_r,T5). \tag{Eq. 9}$$

The filter f is chosen to enhance some desired aspect of U, such as minimizing the energy in U, shaping the frequency spectrum of U to a desired output, avoiding mono-frequency noise (ringing) in U, and the like.

Another approach to avoiding errors relating to inaccuracy of parameters is to use a variation of a Monte Carlo approach to estimation of the parameters. In this case, a random sampling of a parameter in question is used to compute a suite of estimates of U. This ensemble of estimates of U is then evaluated as described above to determine the best estimate of the parameter. For example, errors in receiver depth can create a strong ringing effect in the deghosted data. The optimal depth can then be derived either by visual inspection of the deghosted data or by spectral analysis that identifies strong mono-frequency events. Aside from using the above-noted approach to derive more accurate estimates of the depths (d) of seismic receivers, more accurate estimates of the velocity (V) of sound in water, the reflection operator (R) and other parameters can be similarly derived.

In addition, iterative procedures such as described herein can suffer from noise, as the noise may be propagated and perhaps enhanced by an iterative procedure such as that discussed above. A technique for mitigating noise is to place a damping factor on R, which is the air-water interface reflection operator discussed above. By placing a damping factor on R, the reflection represented by the reflection operator R is reduced slightly in magnitude so that noise artifacts are attenuated as the iterative procedure progresses.

Using techniques according to some implementations, a deghosting procedure can have one or more of the following features. Irregular interfaces that cause ghost data to appear in measured survey data can be handled. Moreover, complex receiver geometries and varying streamer depths can also be handled. Additionally, various factors that can affect propagation or reflection of wavefields can be considered, including different characteristics of the medium through which the wavefields propagate at different positions. In addition, the deghosting procedure can perform wavefield propagations in three dimensions, such that two-dimensional assumptions would not have to be made. While illustrated for single-measurement pressure wavefield, other implementation can include other types of single-measurement wavefields such as particle velocity or acceleration and, in particular, shear wave data.

While the above refers to deghosting data with just a single type of measurement data (e.g., measured pressure data), in practice complementary measurements are sometimes available. In this case, it may be beneficial to constrain the deghosting process by the other types of measurement data. For example, if particle velocity $P_z$ is available from a separate measurement, then it is possible to constrain the deghosting process by combining two different estimates of U (the upgoing wavefield).

In other implementations, it is possible to obtain estimates of U and D by other techniques, such as from a system containing complementary measurements, by processing W in different ways. In such implementations, the estimates of U and D may be improved as follows. Suppose U and D have already estimated using another technique. Then the P⁺(Δt) operator as discussed above can be used to first propagate $U(x_r,y_r,z_r,t)$ to the air-water interface 106, to obtain $U(x_s,y_s,z_s,t)$ by successive iteration of Eq. 5 discussed above. Next, using Eq. 6, D can be back-propagated to the air-water surface using $$D(x,y,z,t-\Delta t)=P^-(-\Delta t)*D(x,y,z,t) \text{ for } z_s<z\leq z_r.$$

The back-propagation of D results in the computed value of D at the air-water interface $D(x_s,y_s,z_s,t)$. Note that this iteration begins with t=tmax. At the air-water interface 106, U and D are related by the reflection operator, hence $U(x_s,y_s,z_s,t)=R*D(x_s,y_s,z_s,t)$. However, if the estimates of U and D are erroneous, then the estimates may be improved by minimizing $U(x_s,y_s,z_s,t)=R*D(x_s,y_s,z_s,t)$. This can be done in a variety of ways, similar to error mitigation techniques described above. The error mitigation techniques described above minimize differences at the receiver location, whereas the techniques here propagate the wavefields to the air-water interface and then compare the wavefields there.

The upgoing wavefield U can be estimated based on particle velocity $P_z$ as follows:

$$U=W+a*P_z, \tag{Eq. 10}$$

where a is a predefined scalar amplitude factor. As a result, if $P_z$ measurement data is available, the two estimates for U based on respective different types of measurement data (one estimate according to Eq. 7 and one estimate according to Eq.

10) can be combined as each may have inherent errors. An example technique of combining the estimates of U includes computing a simple average of the two estimates of U. A more sophisticated technique can include optimization and adaptive procedures described above. Similarly, other complementary measurements such as over/under receiver configurations, accelerometers and so on can be used in tandem with estimates of U obtained herein.

Figure 6:
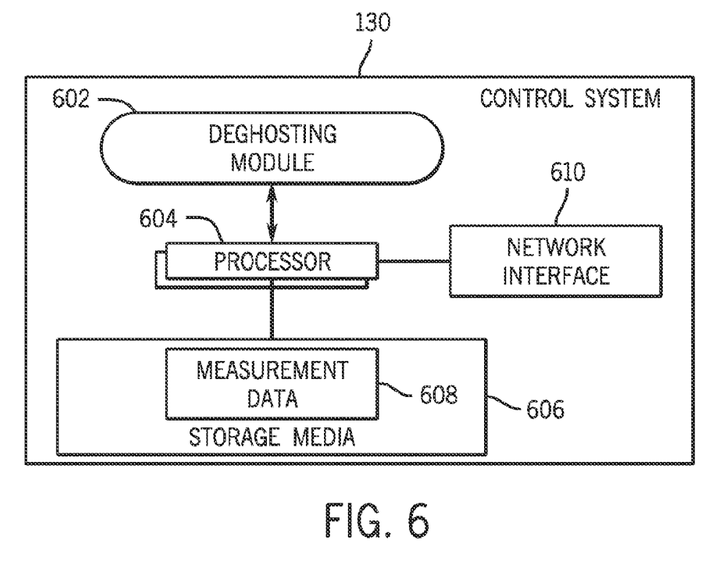
FIG. 6 is a block diagram of a control system according to some implementations.

FIG. 6 illustrates an example control system 130 according to some implementations. The control system 130 includes a deghosting module 602, which can be implemented as machine-readable instructions executable on one or multiple processors 604. The control system 130 can be implemented with a computer system, or with a distributed arrangement of computer systems. A processor can include a microprocessor, microcontroller system, processor module or subsystem, programmable integrated circuit, programmable gate array, or another control or computing device.

The processor(s) 604 is (are) connected to a storage medium (or storage media) 606, which can store measurement data 608 collected by the survey receivers 104 depicted in FIG. 1. The control system 130 also includes a network interface 610 to allow the control system 130 to communicate with another system, such as with the streamer 102 to collect the measurement data, or with another system that communicates the measurement data to the control system 130.

The storage medium (or storage media) 606 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   simulating, by a system comprising a processor, propagation of wavefields along paths in a survey environment, wherein the simulated propagation includes an influence of a reflection at an interface that causes ghost data in measured survey data collected by survey receivers, wherein the influence of the reflection at the interface that causes ghost data in measured survey data is simulated by applying a reflection operator at a position corresponding to a location of the interface, wherein the reflection operator represents the reflection as a function of at least one parameter selected from among water density, water salinity, and solubility of air in water; and
   performing, by the system, deghosting of the measured survey data using the simulated propagated wavefields.

2. The method of claim 1, wherein applying the reflection operator comprises applying the reflection operator that is dampened by a damping factor to mitigate noise in the propagation of the wavefields.

3. The method of claim 1, wherein simulating the propagation of the wavefields comprises simulating propagation of an upgoing wavefield between a survey receiver and the interface, and simulating propagation of a downgoing wavefield between the interface and the survey receiver.

4. The method of claim 3, wherein simulating the propagation of the upgoing wavefield comprises using a first propagation operator for extrapolating the upgoing wavefield at a time point, and wherein simulating the propagation of the downgoing wavefield comprises using a second propagation operator for extrapolating the downgoing wavefield at a time point.

5. The method of claim 1, wherein simulating the propagation includes identifying an upgoing wavefield at a first time point when the measured survey data includes the upgoing wavefield without interference from a downgoing wavefield.

6. The method of claim 5, wherein simulating the propagation further includes computing, by a first propagation operator based on the upgoing wavefield at the first time point, an extrapolated upgoing wavefield at a second time point later than the first time point.

7. The method of claim 6, wherein simulating the propagation further includes computing a downgoing wavefield produced due to reflection of the extrapolated upgoing wavefield at the second time point by the interface.

8. The method of claim 7, wherein simulating the propagation further includes computing, by a second propagation operator based on the downgoing wavefield at the second time point, an extrapolated downgoing wavefield at a third time point later than the second time point, wherein the extrapolated downgoing wavefield at the third time point corresponds to a position of a seismic receiver.

9. The method of claim 8, further comprising subtracting the extrapolated downgoing wavefield at the third time point from measured survey data measured by the seismic receiver, wherein the subtracting produces deghosted survey data.

10. The method of claim 9, wherein the subtracting includes adaptive subtraction that uses an adaptive filter to enhance a target aspect of the deghosted survey data.

11. The method of claim 1, wherein simulating the propagation includes computing a first estimate of a particular wavefield based on a first type of measurement data, the method further comprising:
   computing a second estimate of the particular wavefield using a second type of measurement data; and
   combining the first and second estimates as part of the simulating of the propagation.

12. The method of claim 1, further comprising removing a direct arrival in the measured survey data prior to performing the simulating of the propagation.

13. The method of claim 1, wherein simulating the propagation of the wavefields comprises propagating an upgoing wavefield to the interface, and propagating a downgoing wavefield to the interface, the method further comprising:

comparing the propagated upgoing wavefield and the propagated downgoing wavefield to determine an error.

14. The method of claim 1, further comprising:
computing estimates of an upgoing wavefield using a sample of plural values of a parameter; and
deriving a value of the parameter based on evaluating the computed estimates of the upgoing wavefield.

15. The method of claim 1, wherein simulating the propagation uses a relationship that specifies that a wavefield at a given position is computed based on a summation of wavefields at other positions, as multiplied by respective amplitude terms that account for reflection and geometrical spreading.

16. The method of claim 1, further comprising:
generating, by the system, an image of a subsurface structure using the deghosted measured survey data.

17. A method comprising:
simulating, by a system comprising a processor, propagation of wavefields along paths in a survey environment, wherein the simulated propagation includes an influence of a reflection at an air-water interface that causes ghost data in measured survey data collected by survey receivers, wherein the influence of the reflection at the air-water interface that causes ghost data in measured survey data is accounted for in the simulating by recording the simulated propagated wavefields at a position above the air-water interface, wherein the position is at a distance above the air-water interface equal to a distance of an actual survey receiver below the air-water interface, and wherein the influence of the reflection is accounted for by filling an intervening space between the air-water interface and the position with water; and
performing, by the system, deghosting of the measured survey data using the simulated propagated wavefields.

18. The method of claim 17, further comprising:
generating, by the system, an image of a subsurface structure using the deghosted measured survey data.

19. A system comprising:
at least one processor to:
simulate propagation of an upgoing wavefield and a downgoing wavefield at respective time points, where the simulated propagation includes an influence of a reflection at an interface that cause ghost data in measured survey data; and
perform deghosting of the measured survey data to mitigate the ghost data, using the simulated upgoing and downgoing wavefields,
wherein the simulation of propagation of upgoing and downgoing wavefields is based on identifying an initial upgoing wavefield in an initial condition in which the measured survey data is equal to the initial upgoing wavefield without interference from any downgoing wavefield, and wherein the initial condition includes a condition where a time is less than a predefined time value based on a depth of a survey receiver and a sound velocity in a medium in which the upgoing and downgoing wavefields are propagated.

20. The system of claim 19, wherein the simulated propagation uses a reflection operator that models reflection at the interface that has an irregular shape.

21. The system of claim 19, wherein the measured survey data is by survey receivers in a streamer having an irregular profile.

22. The system of claim 19, wherein the at least one processor is to further generate an image of a subsurface structure using the deghosted measured survey data.

* * * * *